United States Patent

(12) United States Patent
Hills et al.

(10) Patent No.: US 10,384,803 B2
(45) Date of Patent: Aug. 20, 2019

(54) METHODS AND DEVICES FOR LIGHT DISTRIBUTION IN AN AIRCRAFT, AND AIRCRAFT INCLUDING SUCH DEVICES

(71) Applicant: The Boeing Company, Chicago, IL (US)

(72) Inventors: Karen L. Hills, Everett, WA (US); Dianne Lynn McMullin, Bothell, WA (US); Randolph C. Camp, III, Kirkland, WA (US); William Hanson Valentine, Jr., Mill Creek, WA (US); Douglas Alan Brown, Edmonds, WA (US); Rush Frederick Green, Seattle, WA (US); Richard K. Simms, Mukilteo, WA (US); Jennifer J. Rezmer, Seattle, WA (US); Michael Joseph Burgess, Seattle, WA (US)

(73) Assignee: The Boeing Company, Chicago, IL (US)

( * ) Notice: Subject to any disclaimer, the term of this patent is extended or adjusted under 35 U.S.C. 154(b) by 233 days.

(21) Appl. No.: 15/288,126

(22) Filed: Oct. 7, 2016

(65) Prior Publication Data

US 2018/0099763 A1   Apr. 12, 2018

(51) Int. Cl.
B64D 47/02 (2006.01)
B64D 11/00 (2006.01)

(52) U.S. Cl.
CPC ............ B64D 47/02 (2013.01); B64D 11/00 (2013.01); B64D 2011/0038 (2013.01); B64D 2203/00 (2013.01); Y02T 50/53 (2013.01)

(58) Field of Classification Search
CPC ............ B64D 11/00; B64D 2011/0038; B64D 2203/00; B64D 47/02; A61K 31/095;
(Continued)

(56) References Cited

U.S. PATENT DOCUMENTS 1,420,059 A * 6/1922 Roth ................. F21V 33/00
                                                297/217.6
1,488,888 A * 4/1924 Lewensohn ............ A47C 7/725
                                                297/217.6
(Continued)

FOREIGN PATENT DOCUMENTS

DE    102008008153    8/2009
EP       2778065    9/2014

OTHER PUBLICATIONS

European Patent Office, Extended European Search Report.
Machine-generated English abstract of German Patent No. DE 102008008153, downloaded from Espacenet.com Apr. 1, 2019.

Primary Examiner — Medhat Badawi
(74) Attorney, Agent, or Firm — Dascenzo Intellectual Property Law, P.C.

(57) ABSTRACT

Lighting components for illuminating an aisle portion of a cabin floor of an aircraft, and aircraft and passenger seats for an aircraft including the same are disclosed. Said lighting components are configured to illuminate at least a portion of the aisle, between adjacent passenger seats positioned on either side of the aisle. The lighting components are configured to direct light towards the cabin floor using a specially designed housing and reflector surface that are designed to illuminate objects in the aisle, while minimizing light pollution in the cabin and detection by passengers on board the aircraft. Said lighting components are optionally mounted on one or more passenger seats, and/or may be integrally formed with a passenger seat. Lighting components include a curved reflector surface configured to reflect light from a light source positioned within the housing such that it is directed towards the aisle to create the desired illumination.

16 Claims, 6 Drawing Sheets

(58) Field of Classification Search
CPC ........ A61K 31/14; A61K 31/66; A61K 45/06;
A61K 51/04; A61K 51/0497; F21V
15/012; F21V 15/01; F21V 15/02; F21V
1/22; F21W 2131/109; F21W 2131/103;
F21W 2131/10; F21W 2107/30; B60Q
3/46; B60Q 3/43; B60Q 3/44
See application file for complete search history.

(56) References Cited

U.S. PATENT DOCUMENTS

| | | | | |
|---|---|---|---|---|
| 1,575,690 | A * | 3/1926 | Kausal | A47C 7/725 362/131 |
| 1,879,273 | A * | 9/1932 | Irminger | F21V 33/00 362/131 |
| 2,310,593 | A * | 2/1943 | Orlicki | E04F 11/1836 256/59 |
| 2,635,681 | A * | 4/1953 | Hiltman | G09F 23/00 297/217.6 |
| 2,766,372 | A * | 10/1956 | Albris | F21V 33/00 362/146 |
| 2,865,438 | A * | 12/1958 | Machielse | A47C 7/725 297/217.6 |
| 3,679,893 | A * | 7/1972 | Shemitz | F21V 7/09 362/345 |
| 4,161,769 | A * | 7/1979 | Elliott | E04F 11/1836 362/146 |
| 4,298,916 | A * | 11/1981 | Shemitz | F21S 8/00 362/127 |
| 4,471,353 | A * | 9/1984 | Cernik | G08C 23/04 331/155 |
| 5,222,799 | A * | 6/1993 | Sears | F21S 8/037 362/146 |
| 5,530,628 | A * | 6/1996 | Ngai | F21V 5/02 362/127 |
| 5,812,714 | A | 9/1998 | Hulse | |
| 5,961,072 | A * | 10/1999 | Bodle | A62B 3/00 244/118.5 |
| 5,971,571 | A * | 10/1999 | Rose | F21S 8/043 359/853 |
| 6,140,921 | A * | 10/2000 | Baron | G08B 5/00 340/457 |
| 6,145,996 | A * | 11/2000 | Shimada | F21S 2/00 362/146 |
| 6,520,666 | B1 | 2/2003 | Beyerlein et al. | |
| 6,578,795 | B2 * | 6/2003 | Romca | B64D 11/00 116/209 |
| 7,178,954 | B2 * | 2/2007 | Blechschmidt | B64D 11/00 244/118.5 |
| 7,204,622 | B2 * | 4/2007 | Dowling | H05B 33/0842 362/147 |
| 7,568,818 | B2 * | 8/2009 | Pfund | F21S 8/033 362/303 |
| 7,942,537 | B2 * | 5/2011 | Krijn | G02B 6/002 362/19 |
| 8,896,456 | B2 * | 11/2014 | Curtis | G08B 5/00 340/667 |
| 9,206,953 | B2 * | 12/2015 | Roos | E04F 11/1817 |
| 9,327,146 | B2 * | 5/2016 | Rittner | A62B 18/02 |
| 9,360,119 | B2 * | 6/2016 | Kinback | F16K 1/305 |
| 9,494,728 | B2 * | 11/2016 | Kim | G02B 6/0073 |
| 9,527,477 | B1 * | 12/2016 | Cech | B60R 22/48 |
| 9,527,479 | B2 * | 12/2016 | Schneider | B60R 99/00 |
| 9,784,433 | B2 * | 10/2017 | Camp, III | B60Q 3/43 |
| 9,904,393 | B2 * | 2/2018 | Frey | G06F 3/0414 |
| 2004/0213001 | A1 | 10/2004 | Sayers et al. | |
| 2005/0018439 | A1 | 1/2005 | Schevardo et al. | |
| 2005/0110952 | A1 * | 5/2005 | Pho | A47C 1/13 353/28 |
| 2007/0001124 | A1 * | 1/2007 | Moreno Sobrino | A47C 1/13 250/484.4 |
| 2007/0061847 | A1 * | 3/2007 | Callahan | B64D 11/0015 725/76 |
| 2007/0109802 | A1 * | 5/2007 | Bryan | B64D 11/00 362/471 |
| 2008/0106702 | A1 | 5/2008 | Huonker | |
| 2009/0112407 | A1 * | 4/2009 | Kneller | B64D 11/0015 701/45 |
| 2011/0007280 | A1 * | 1/2011 | Patterson | F21S 6/001 353/12 |
| 2011/0089864 | A1 | 4/2011 | Wasniewski et al. | |
| 2014/0192268 | A1 * | 7/2014 | Petrisor | G06F 3/017 348/734 |
| 2016/0083090 | A1 * | 3/2016 | Savian | B64D 11/003 244/118.5 |
| 2016/0091173 | A1 * | 3/2016 | Camp, III | B60Q 3/43 362/242 |
| 2016/0159276 | A1 * | 6/2016 | Thomas | B64D 11/00 315/77 |
| 2016/0214529 | A1 * | 7/2016 | Valentine, Jr. | B60Q 3/53 |
| 2017/0023208 | A1 * | 1/2017 | Madril | F21V 7/09 |
| 2017/0029112 | A1 * | 2/2017 | O'Kell | B64D 11/00 |
| 2017/0030553 | A1 * | 2/2017 | Szeto | F21V 9/00 |
| 2017/0073074 | A1 * | 3/2017 | Gagnon | B64D 11/00 |
| 2017/0073075 | A1 * | 3/2017 | Gagnon | H05B 37/0227 |
| 2017/0136681 | A1 * | 5/2017 | Lahogue | B29C 49/6409 |
| 2017/0144764 | A1 * | 5/2017 | Moran | B64D 11/0602 |
| 2017/0247111 | A1 * | 8/2017 | Valentine, Jr. | B64D 11/00 |
| 2017/0341725 | A1 * | 11/2017 | Skahan | B64C 1/061 |
| 2017/0368990 | A1 * | 12/2017 | Blacken | B60Q 3/62 |
| 2018/0016014 | A1 * | 1/2018 | Burd | E05B 65/06 |
| 2018/0029531 | A1 * | 2/2018 | Di Trapani | B64D 11/00 |
| 2018/0098041 | A1 * | 4/2018 | Lawrence | H04N 9/68 |
| 2018/0099763 | A1 * | 4/2018 | Hills | B64D 47/02 |

* cited by examiner

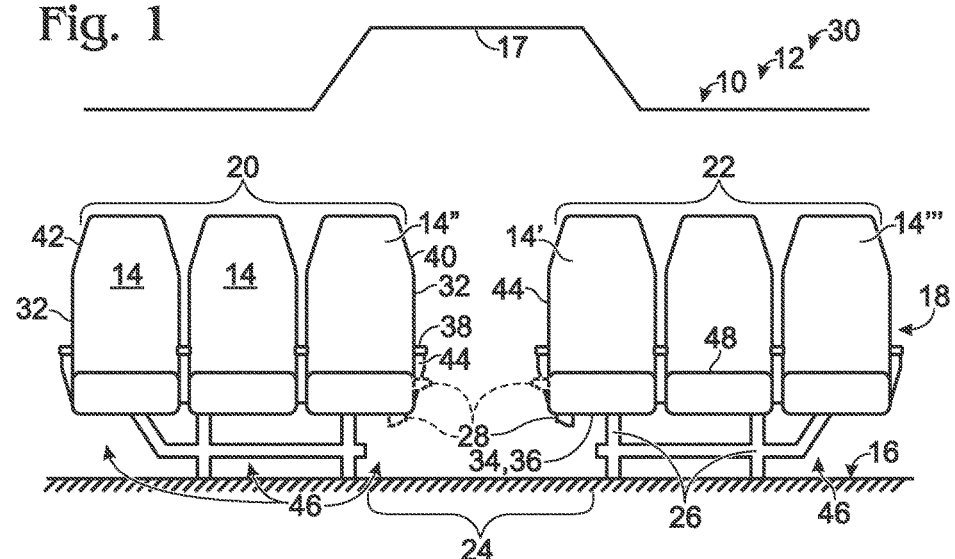

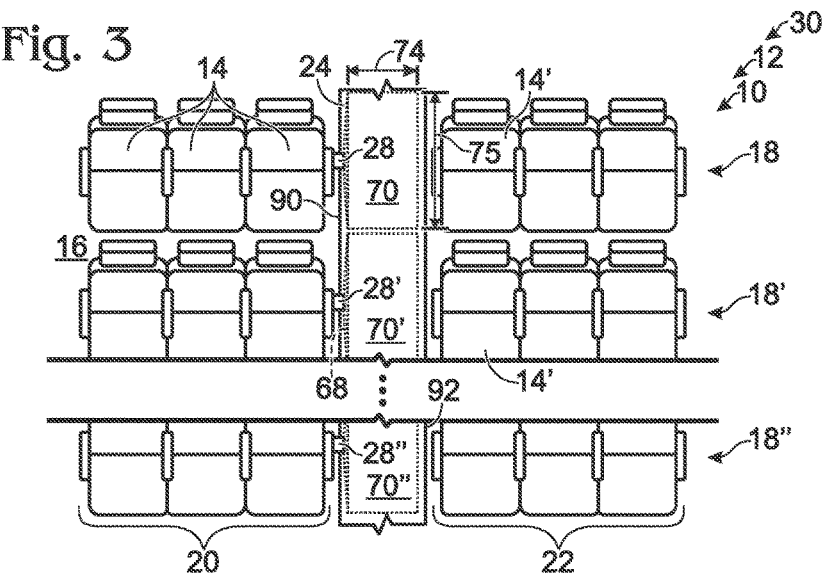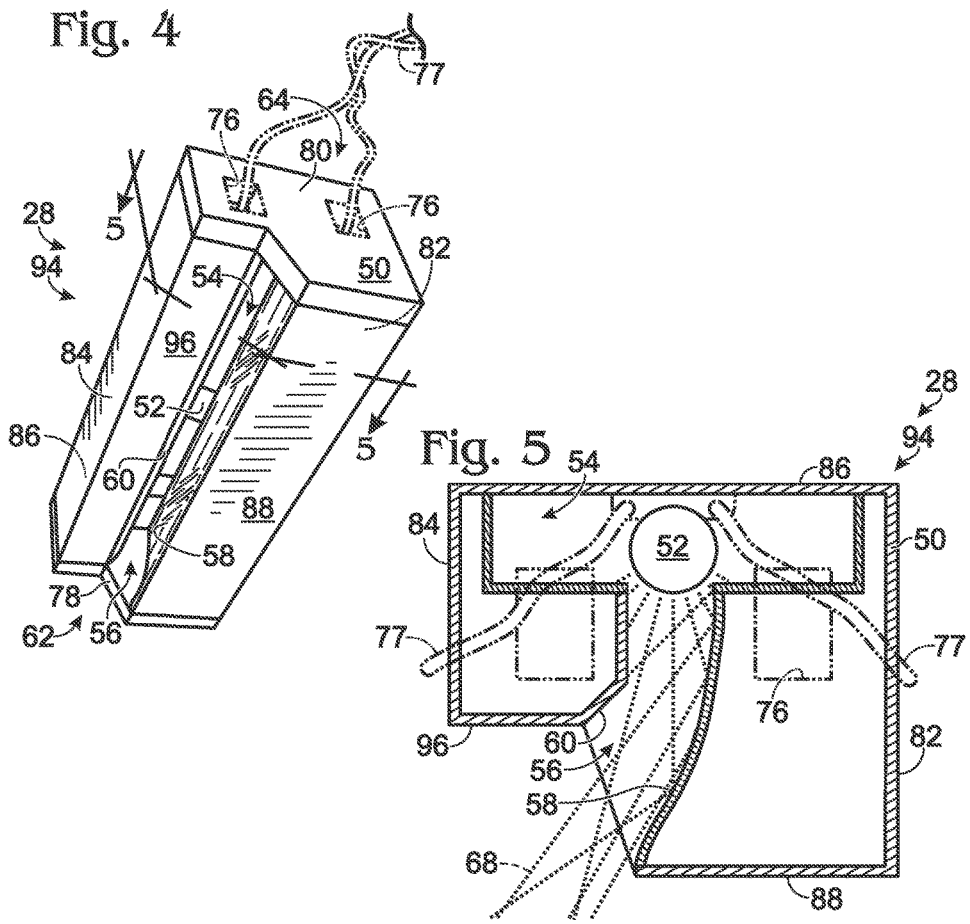

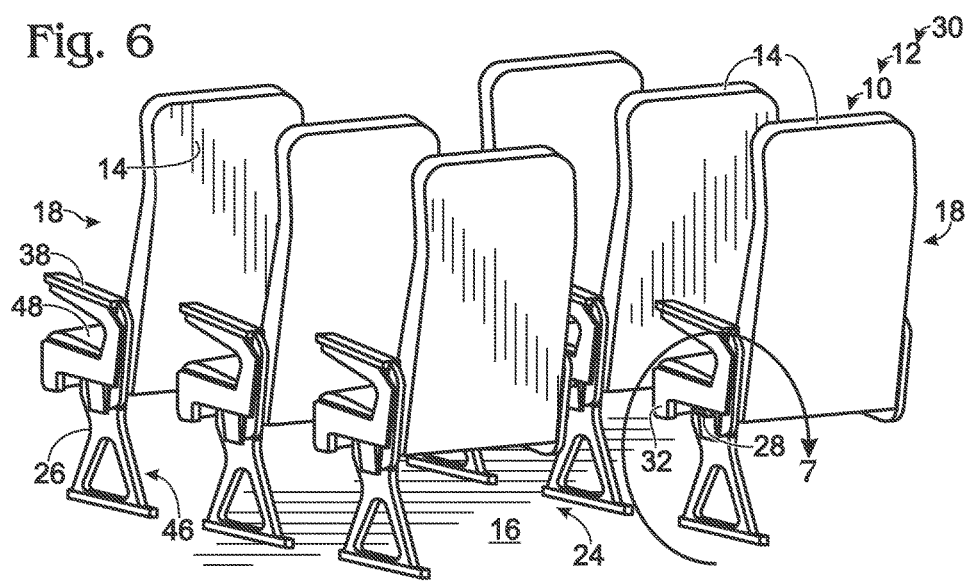
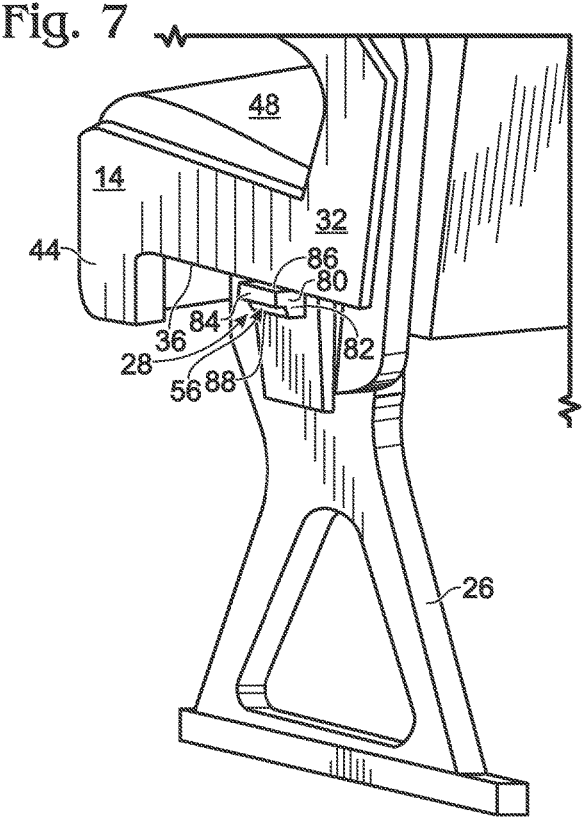

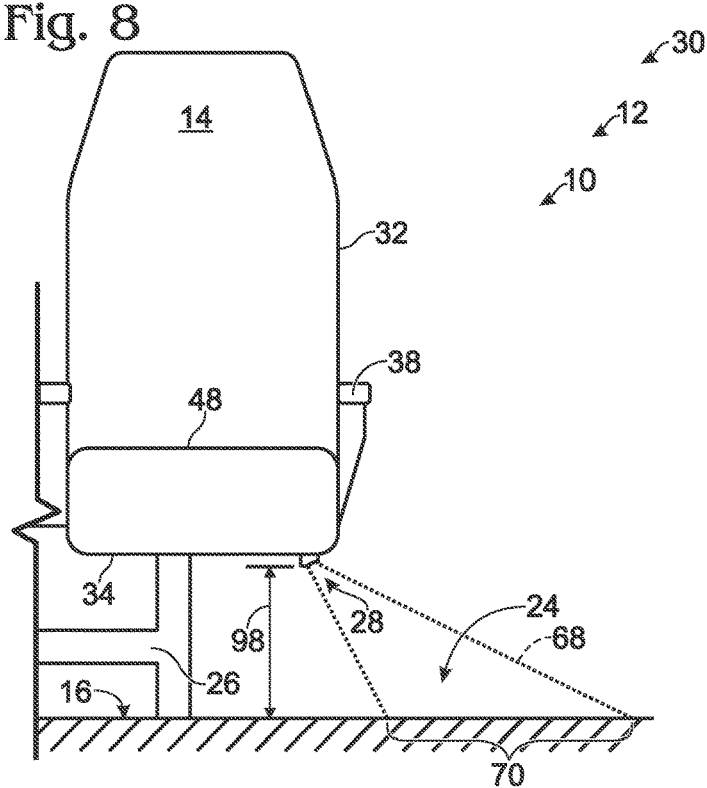
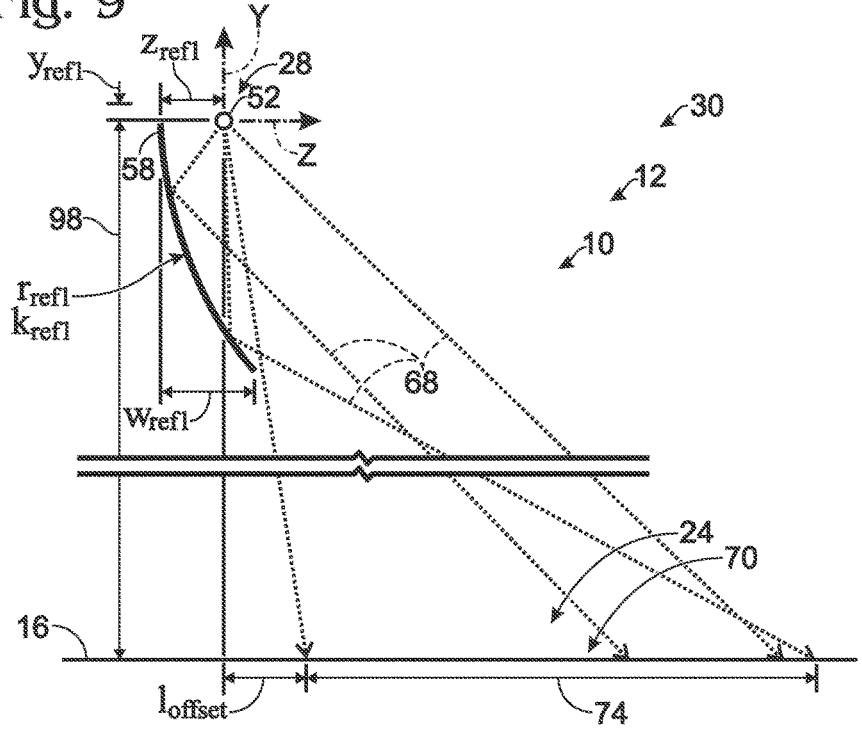

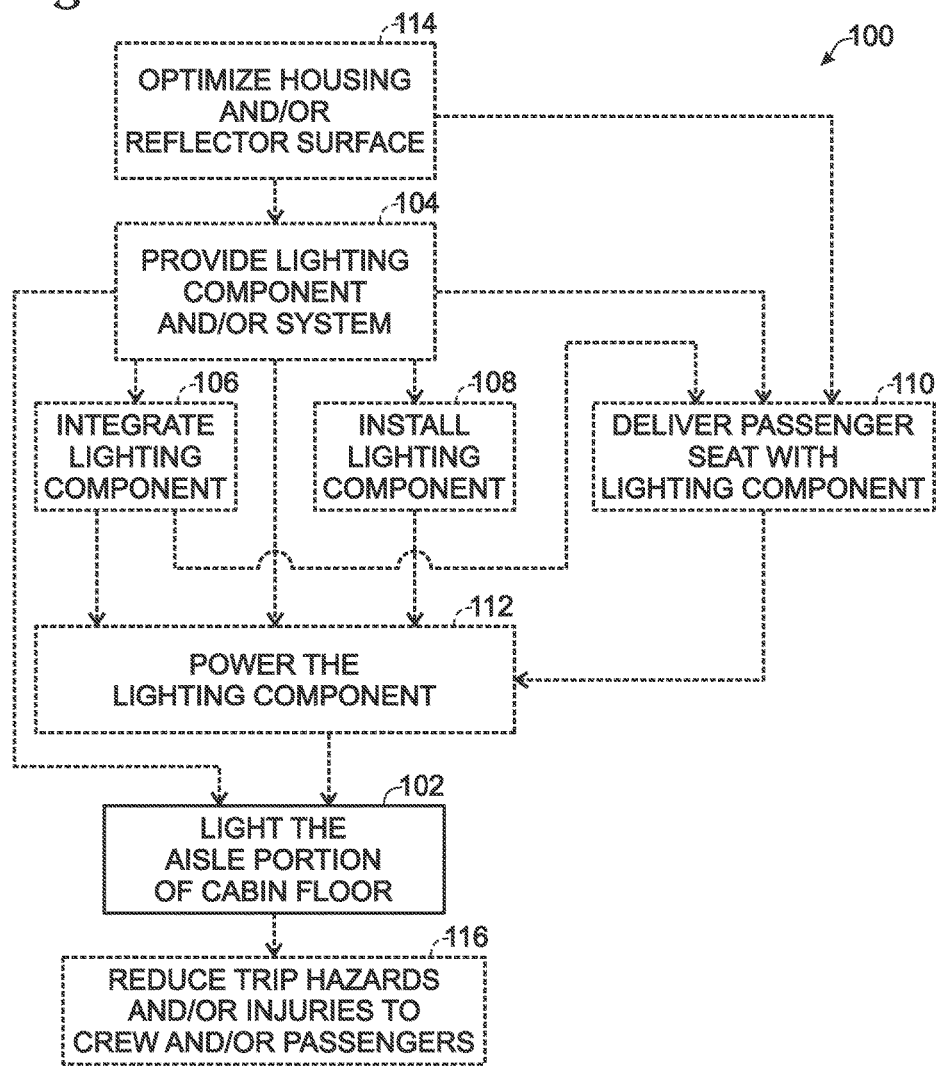

METHODS AND DEVICES FOR LIGHT DISTRIBUTION IN AN AIRCRAFT, AND AIRCRAFT INCLUDING SUCH DEVICES

FIELD

The present disclosure relates to methods and devices for light distribution in an aircraft (such as an aisle within a cabin of a passenger aircraft), and to aircraft including such devices.

BACKGROUND

Within the cabin of a passenger aircraft, general overhead lighting illuminates the cabin during boarding and deboarding. However, the general cabin lights are often dimmed during flight, for passenger comfort, especially during nighttime flights, which can result in the cabin floor and aisles being too dark for quick, easy, safe, and comfortable movement about the cabin during the flight. Additionally, galleys, lavatories, and other areas of the aircraft are typically illuminated throughout the flight, which further increases the difficulty for flight attendants (and passengers moving about the aircraft), who must adapt when entering a relatively dark cabin from the bright galley area, for instance. While passengers typically have access to individual overhead reading lights that focus light for individual use, these reading lights can create shadows in the aisles, even further interfering with vision of the aisles and objects protruding therein.

This lighting scenario can complicate the work of flight attendants, who perform job duties in a unique environment that includes reduced atmospheric pressure, low humidity, relatively high noise levels, air turbulence, tight spaces, and sloping floors. Adding low light levels to this environment makes tasks even more difficult for flight attendants, increasing the risks of injuries as they move through the cabin performing work duties. For example, tripping on carpet, carpet edges, seat legs, passenger legs, blankets, pillows, luggage, coats, purses, toys, and etc. all are potential hazards in flight attendants' workspace (e.g., the cabin aisle(s)) and is often caused by their not being able to see the floor sufficiently. Such hazards can result in work-related injuries and lost workdays.

Existing emergency lighting such as photoluminescent strips along the floor path of the cabin and emergency seat lighting provide insufficient lighting to prevent tripping and slipping, inconsistently light the floor, and/or direct light in the wrong direction(s) (e.g., upwards, towards the ceiling) to prevent injuries for flight attendants in the normal course of their work tasks. Existing aircraft non-emergency lighting is not suitable for illuminating the floor without disturbing passengers, and there thus remains a need for reducing the risk from hazards in aircraft cabin aisles and other interior spaces, without disturbing passengers.

SUMMARY

Presently disclosed lighting components may be mounted to one or more passenger seats in an aircraft to illuminate the aisle between rows of passenger seats. The presently disclosed lighting components may be positioned and sized so as to not protrude into the aisle as well as to not increase light pollution within the cabin, while providing low intensity, uniform illumination of the aisle. Generally, presently disclosed lighting components may include a housing defining a cavity and a light channel configured to allow light to exit the housing, a light source within the cavity or shroud, and a reflector surface configured to reflect light emanating from the light source through the light channel and towards the cabin floor of the aircraft. The reflector surface may optionally be curved and at least partially define the light channel. The reflector surface, in combination with the shape of the housing may be configured to direct light downwards (towards the cabin floor), while preventing light from traveling upwards from the lighting component (towards the ceiling and/or passenger eye level). In this way, a direct line of sight to the light channel may be prevented from the perspective of passengers and crew that are seated in the passenger seats or walking about the cabin.

Presently disclosed systems may include an aircraft and/or a plurality of such lighting components mounted within the aircraft, such that an aisle may be illuminated. For example, systems may include one lighting component per row of passenger seats, and in some cases may include the passenger seat itself, with the lighting component formed integrally therein, or secured thereto during manufacture. Related methods include illuminating an aisle portion of a cabin floor of a passenger aircraft using one or more presently disclosed lighting components. Methods may optionally include integrating a lighting component into a passenger seat and/or delivering a passenger seat including a lighting component secured thereto or formed therewith. Additionally or alternatively, methods may include optimizing the shape and size of the reflector surface and/or housing of the lighting component to achieve the desired lighting pattern on the cabin floor.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

FIG. 1 is a schematic view of illustrative, non-exclusive examples of systems including a row of passenger seats and one or more lighting components for illuminating the aisle, according to the present disclosure.

FIG. 2 is a schematic view of illustrative, non-exclusive examples of lighting components, according to the present disclosure.

FIG. 3 is a schematic view of illustrative, non-exclusive examples of an aircraft including one or more lighting components, according to the present disclosure.

FIG. 4 is a perspective view of a first embodiment of a lighting component according to the present disclosure.

FIG. 5 is a cross-section view of the lighting component shown in FIG. 4, taken along line 5-5 in FIG. 4.

FIG. 6 is a perspective view of one example of a system according to the present disclosure, including a plurality of passenger seats and one or more lighting components.

FIG. 7 is an enlarged view of one of the lighting components of the system of FIG. 6, as positioned on a respective passenger seat.

FIG. 8 is an elevation view of a passenger seat having a lighting component coupled thereto, showing the light pattern created on the cabin floor from the lighting component.

FIG. 9 is a schematic illustration representing parameters of a reflector surface of a presently disclosed lighting component that may be modified to create a desired light pattern on the cabin floor.

FIG. 10 is a flowchart illustrating methods according to the present disclosure.

DESCRIPTION

Figure 11:
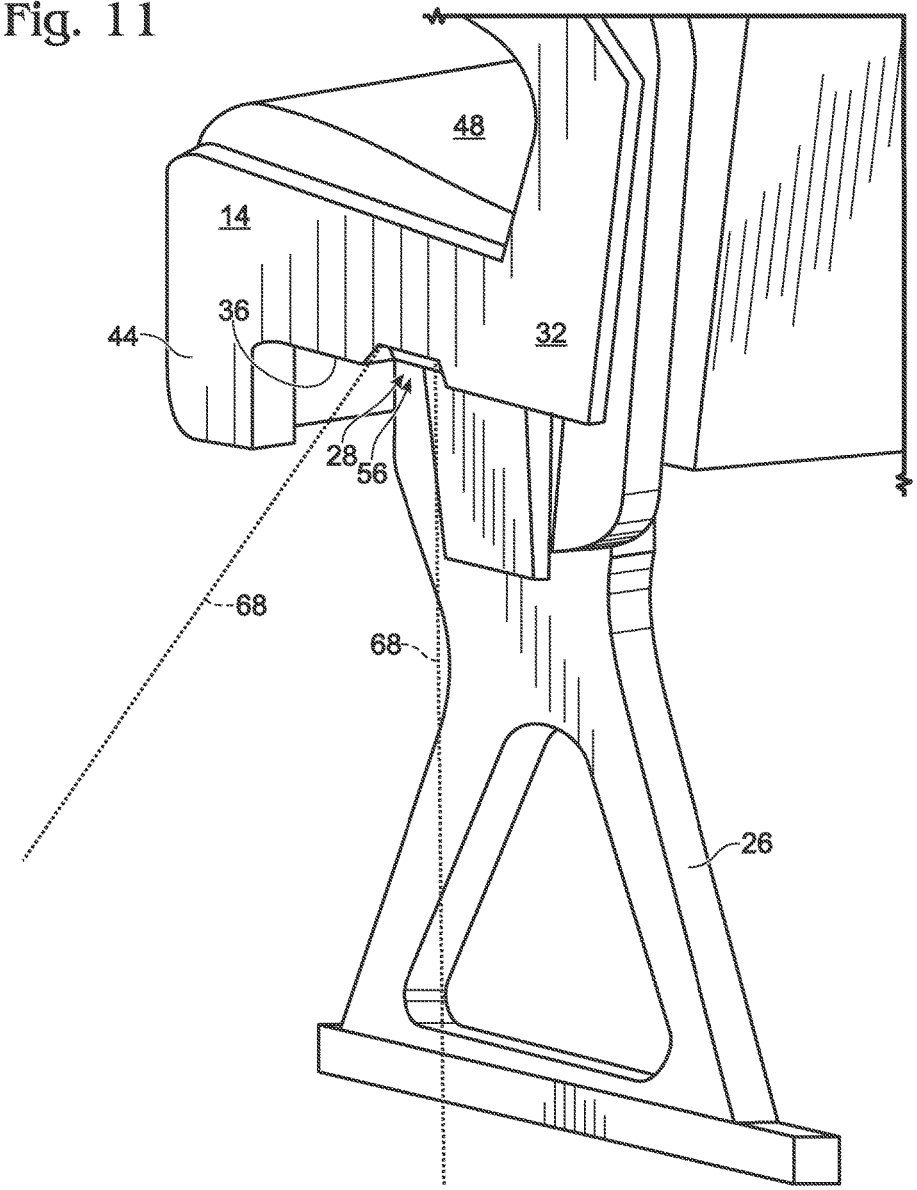
FIG. 11 is a partial view of a lighting component according to the present disclosure, recessed within a side portion of a passenger seat.

Lighting components, systems and aircraft including the same, and related methods are disclosed. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

FIG. 1 schematically represents a portion of an interior space, such as a passenger cabin 10 of a passenger aircraft 12 (generally a commercial passenger aircraft, though other types of aircraft 12 are also within the scope of this disclosure, such as regional jets, private jets, military aircraft, and the like). A plurality of passenger seats 14 are arranged in a cabin floor 16 of passenger cabin 10. FIG. 1 illustrates a row 18 of passenger seats 14, with a first plurality 20 of passenger seats and a second plurality 22 of passenger seats arranged on either side of an aisle portion 24 of cabin floor 16. While FIG. 1 illustrates a single row 18 of passenger seats, it is to be understood that aircraft 12 generally includes a plurality of rows 18, each of which may have more or fewer passenger seats 14 than illustrated, and may optionally include a plurality of aisle portions 24. Passenger seats 14 are illustrated as cantilevered passenger seats in FIG. 1, with one or more leg supports 26 being spaced apart from (e.g., outboard, relative to) aisle portion 24, though other styles of passenger seats 14 are also within the scope of the present disclosure. In some such examples, leg supports 26 are positioned outboard relative to lighting component 28. One or more lighting components 28 are coupled to, mounted on, recessed within, secured to, integrated into, and/or formed integrally with one or more respective passenger seats 14. Presently disclosed systems 30 include aircraft 12, one or more passenger seats 14, one or more rows 18 of passenger seats 14, and/or one or more lighting components 28.

In some examples, system 30 includes one lighting component 28 per row 18. For example, passenger seat 14' may include a respective lighting component 28, while the other respective passenger seats 14 of row 18 do not. In these examples, lighting component 28 is positioned and configured to illuminate aisle portion 24 between passenger seat 14' and passenger seat 14" on the opposite side of aisle portion 24. In other examples, system 30 includes more than one lighting component 28 per row 18. For example, passenger seat 14" may include an additional respective lighting component 28. Additionally or alternatively, respective passenger seats outboard from aisle 24, such as passenger seat 14''' may include a respective lighting component 28, such as in examples of larger passenger aircraft 12 having rows 18 broken into more than one aisle portion 24. In examples including multiple aisle portions 24, systems 30 may include at least one lighting component 28 per row 18, per aisle portion 24. In some examples, lighting components 28 are distributed evenly amongst passenger seats 14 within cabin 10, and/or distributed evenly amongst rows 18 within cabin 10.

Lighting components 28 may be positioned in various locations with respect to passenger seat 14. For example, one or more lighting components 28 may be positioned on or in a side portion 32 of passenger seat 14 (e.g., inboard side 40 and/or outboard side 42 of passenger seat 14, depending on the configuration of aircraft 12), adjacent aisle portion 24, on or in a lower surface 34 or lower frame structure 36 (e.g., an underside of a cushion rail) of passenger seat 14, on or in an arm rest portion 38 of passenger seat 14, on a rubstrip of passenger seat 14 or other monument within aircraft 12, and/or on or in a seat shroud 44 (also referred to herein as a side portion 44) of passenger seat 14. For example, passenger seat 14' in FIG. 1 has a first respective lighting component 28 (shown in solid line) positioned on lower surface 34, with a second respective lighting component 28 shown in dashed line positioned on arm rest portion 38 and representing examples of different positions and/or locations of lighting component 28 with respect to passenger seat 14, and/or examples where a respective passenger seat 14 may include more than one respective lighting components 28. Additionally or alternatively, lighting component 28 may be arranged such that it does not protrude past arm rest portion 38 and/or into aisle portion 24. In some examples, lighting component 28 is recessed into passenger seat 14, such as recessed into arm rest portion 38 and/or side portion 32 (e.g., a side panel of passenger seat 14).

Such configurations of systems 30 may be designed to minimize the conspicuousness of lighting components 28 to passengers and crew onboard aircraft 12. For example, lighting components 28 may be sized to be relatively small and unobtrusive, and positioned so as not to interfere with passenger movement, with passenger's articles placed on cabin floor 16, and/or with crew members and galley carts moving about passenger cabin 10. In some examples, lighting components 28 are configured to be hidden from view of passengers within aircraft 12. Additionally or alternatively, lighting components 28 may be configured to minimize light pollution within passenger cabin 10 and/or restrict (and optionally prevent) light from being directed upwards from lighting component 28 (e.g., away from cabin floor 16 and towards a ceiling portion 17 (also referred to herein as a cabin ceiling 17) of passenger cabin 10). Nonetheless, lighting components 28 illuminate at least a portion of aisle portion 24 and/or at least a portion of cabin floor 16 (e.g., a portion of cabin floor 16 that forms an exit row within aircraft 12) such that objects and articles within aisle portion 24 are illuminated, thereby reducing trip hazards for passengers and crew members in some examples. In some examples, however, lighting components 28 are positioned and configured to minimize illumination of other portions of cabin floor 16, such as those corresponding to storage cavities 46 underneath passenger seats 14 (e.g., such storage cavities 46 may be defined by lower surface 34 of a seat portion 48 of passenger seat 14, cabin floor 16, and/or leg support 26) for storage of passenger articles during flight.

In some examples, lighting components 28 are configured to dimly, but substantially uniformly, illuminate aisle portion 24 of cabin floor 16 (e.g., the portion of cabin floor 16 between passenger seat 14' and passenger seat 14"). For example, lighting components 28 may be configured to illuminate objects on or protruding into aisle portion 24 and/or other portions of cabin floor 16 within the zone of mesopic vision, such as with a luminance of between about 0.001 and about 3 $cd/m^2$ (candela per square meter). In other examples, lighting components 28 may be configured to illuminate aisle portion 24 and/or cabin floor 16 outside the zone of mesopic vision (e.g., in scotopic vision).

FIG. 2 schematically illustrates examples of lighting component 28. Lighting component 28 generally includes a housing 50, a light source 52 contained within a cavity 54 defined by housing 50, and a light channel 56 configured to allow light from light source 52 to exit housing 50 and illuminate at least a portion of an exterior surface 57 outside of housing 50. Exterior surface 57 is generally aisle portion 24 of cabin floor 16 of aircraft 12, as described herein, but lighting components 28 may be configured to illuminate other exterior surfaces 57 as well. For example, lighting components 28 may be configured to illuminate one or more other exterior surfaces 57 within an aircraft or other vehicle, such as within a train, a bus, or vehicle. Lighting component 28 also includes a reflector surface 58 configured to reflect light emanating from light source 52 through light channel 56 and towards cabin floor 16 of aircraft 12. Reflector surface 58 is curved and at least partially defines (or forms at least a portion of) light channel 56. In some examples, lighting component 28 also includes an optical absorber surface 60 arranged with respect to reflector surface 58 such that optical absorber surface 60 is configured to absorb light emanating from light source 52, such as light traveling in an undesired direction (e.g., towards optical absorber surface 60, when optical absorber surface 60 is positioned between light source 52 and the undesired direction). For example, reflector surface 58 is configured to reflect light towards cabin floor 16, while optical absorber surface 60 may be configured to restrict light from being directed upwards, away from cabin floor 16 (e.g., towards ceiling portion 17 of passenger cabin 10 in FIG. 1). In some examples, optical absorber surface 60 functions in combination with the size and shape of housing 50 to restrict (and/or prevent) light emanating from light source 52 from exiting light channel 56 towards ceiling portion 17.

In some examples, optical absorber surface 60 and reflector surface 58 are arranged opposite each other, thereby at least partially defining light channel 56 therebetween. Reflector surface 58 is substantially concave facing light channel 56, and/or optical absorber surface is substantially convex facing light channel 56 in some examples. In some lighting components 28, light channel 56 extends longitudinally from a first end region 62 of housing 50 to a second end region 64 of housing 50, opposite first end region 62. Similarly, reflector surface 58 and/or optical absorber surface 60 extend longitudinally from first end region 62 to second end region 64 in some examples (e.g., a length 67 of reflector surface 58 is substantially equal to a length 66 of housing 50 in some examples, e.g., differing by the thickness of walls of housing 50). In other examples, reflector surface 58 and/or optical absorber surface 60 may extend longitudinally between first end region 62 and second end region 64 for just a portion of length 66 of housing 50. In some examples, reflector surface 58 and/or optical absorber surface 60 may include two or more disjointed segments of said reflector surface 58 and/or optical absorber surface 60.

Light source 52 (which may be a plurality of light sources 52 in some examples) is configured to emit (e.g., project and/or reflect) a light beam 68, which in turn results in an area of illumination 70 on exterior surface 57, also referred to herein as light pattern 70. Light pattern 70 is rectangular in some examples. In other examples, lighting component 28 can be configured to create light pattern 70 in other shapes, such as oval, elliptical, circular, polygonal, or any other desired shape. In some examples, light pattern 70 is not clearly defined, but may gradually fade as radial distance from a center 72 of light pattern 70 increases. In some examples, lighting component 28 is configured to reflect light onto exterior surface 57 such that light pattern 70 has a width cone 74 sufficient to span an aisle portion (e.g., aisle portion 24 of FIG. 1) of cabin floor 16. In this manner, lighting component 28 may be configured to illuminate objects protruding into the aisle of cabin floor 16, such as stray articles belonging to passengers, straps, bags, clothing, and etc. that may pose hazards for crew and passengers alike.

The size and shape of housing 50, light source 52, optical absorber surface 60, and/or reflector surface 58 properties may be adjusted and optimized in order to create the desired light pattern 70. For example, alteration of design parameters of the shape and size of reflector surface 58 (e.g., a reflector radius, a reflector conic constant, a horizontal displacement of the reflector surface relative to the light source, a reflector length, a reflector width, and/or a vertical displacement of reflector surface 58 relative to light source 52) can be altered to result in a desired light pattern shape, width, length, and/or offset from lighting component 28.

Light source 52 is a light emitting diode (LED) in some examples. In some examples, light source 52 is an organic light-emitting diode (OLED) and/or a polymer light-emitting diode (PLED). In other examples, light source 52 may be a different type of light source (e.g., a non-LED light source, such as an electrical filament bulb, a fluorescent bulb, an incandescent bulb, a luminescent light source, and/or any other suitable light source). In some examples, light source 52 has a low power consumption, such as less than about 2 watts, less than about 1.5 watts, less than about 1 watt, less than about 0.5 watts, and/or less than about 0.25 watts. Housing 50 may optionally include one or more ports 76 for powering lighting component 28 (e.g., for receiving one or more wires 77 for powering light source 52), which may be powered by one or more of a battery, a capacitor, solar energy, and energy harvesting. In some examples, light source 52 is hard-wired directly to aircraft power of aircraft 12, to seat activation power for passenger seat 14, and/or through in-flight entertainment power of aircraft 12. Light source 52 may be positioned with respect to light channel 56 such that light source 52 is configured to direct light towards light channel 56, such as by being positioned adjacent an opposite wall of housing 50 from light channel 56, in some examples.

Reflector surface 58 is formed from any material that reflects light from light source 52 as desired for a given application of lighting component 28. In some examples, reflector surface 58 is formed from a specular reflective material, aluminum adhesive tape, specular reflective paint, a metal material deposition layer, a polymeric specular film, and/or an adhesive film. Housing 50 may be formed of any material, and in some examples is formed from a polymeric material, such as a 3D printing resin (e.g., Kydex®). Optical absorber surface 60 is formed from any material that absorbs light and/or limits light from being emitted beyond optical absorber surface 60, in the direction of optical absorber surface 60 relative to light source 52. In some examples, optical absorber surface 60 is formed of the same material as housing 50.

Housing 50 may take many various forms, but some examples include a first side wall 78 in first end region 62, a second side wall 80 in second end region 64, a mounting wall 82 extending between first side wall 78 and second side wall 80, and a front wall 84 opposite mounting wall 82. Generally, when secured within aircraft 12, lighting component 28 may be mounted to a passenger seat (e.g., passenger seat 14 of FIG. 1) via mounting wall 82, while front wall 84, first side wall 78, and second side wall 80 protrude from the passenger seat surface to which mounting wall 82 is secured. Housing 50 may be secured to a passenger seat or other monument within the aircraft in any suitable fashion, such as via an adhesive, via one or more fasteners, recessed into the passenger seat or monument, and/or integrally formed with the passenger seat or monument. Additionally or alternatively, housing 50 may include an upper wall 86 connecting first side wall 78, second side wall 80, front wall 84, and mounting wall 82. Similarly, housing 50 may include a lower wall 88 opposite upper wall 86 and connecting first side wall 78, second side wall 80, and mounting wall 82. Within cavity 54 of housing 50, light source 52 may be coupled to mounting wall 82, upper wall 86, first side wall 78, and/or second side wall 80. In some examples, reflector surface 58 is adjacent lower wall 88 of housing 50, such as by extending from lower wall 88 upwards towards upper wall 86.

Housing 50 is sized so as to be unobtrusive, and/or minimally visible, to avoid interfering with passengers in their seats, and/or to avoid or minimize protrusion into aisle portion 24 or beyond passenger seat 14 (e.g., beyond arm rest portion 38 in FIG. 1). In some examples, length 66 of housing 50 is less than about 5 inches, less than about 2 inches, less than about 1.5 inches, less than about 1 inch, and/or less than about 0.5 inches, a width 87 of housing 50 is less than about 1.5 inches, less than about 1 inch, less than about 0.5 inches, and/or less than about 0.25 inches, and/or a depth of housing 50 is less than about 1.5 inches, less than about 1 inch, less than about 0.5 inches, and/or less than about 0.25 inches.

FIG. 3 schematically illustrates a plurality of rows 18 (e.g., first row 18, second row 18', and third row 18") of passenger seats 14 within main cabin 10 of aircraft 12, where each respective row 18 includes a respective first plurality 20 of seats 14 and a respective second plurality 22 of passenger seats 14 on opposite sides of aisle portion 24 from each other. While FIG. 3 illustrates three passenger seats 14 on either side of aisle portion 24 per row 18, more or fewer passenger seats 14 may be positioned in each row, with the same or different number of passenger seats 14 on either side of aisle portion 24. In some examples, aisle portion 24 may separate just a single passenger seat 14 on one or both sides of aisle portion 24. As shown in FIG. 3, some systems 30 include one lighting component 28 per row 18 (e.g., first lighting component 28, second lighting component 28', and third lighting component 28").

Lighting components 28 are shown coupled to the respective passenger seat 14 adjacent aisle portion 24 in each row 18, on one side of aisle portion 24. In other examples, systems 30 may include lighting components 28 coupled to respective passenger seats 14 adjacent aisle portion 24 on each side of aisle portion 24, or lighting components 28 may be coupled to respective passenger seats 14 on alternating sides of aisle portion 24 in some examples (e.g., coupled to passenger seat 14 adjacent a first side 90 of aisle portion 24 in row 18, coupled to passenger seat 14' adjacent a second side 92 of aisle portion 24 in row 18', and so on). In some examples, each respective passenger seat 14 within aircraft 12 may include a respective lighting component 28 secured thereto. As shown in FIG. 3, width cone 74 of light pattern 70 spans aisle portion 24 in some examples. Additionally or alternatively, a length 75 of light pattern 70 is sufficient to extend along aisle portion 24 to overlap with adjacent respective light patterns 70 in some examples. While small gaps are shown between adjacent light patterns 70, 70', 70" in FIG. 3 for clarity, in some examples, adjacent light patterns 70 have no gaps in between, and/or overlap each other. For example, light pattern 70 corresponding to row 18 overlaps light pattern 70' (corresponding to row 18'), and/or light pattern 70' overlaps light pattern 70" (corresponding to row 18") in some examples. In this manner, lighting components 28 of system 30 may be configured to illuminate at least substantially the entire aisle portion 24 of cabin floor 16, between adjacent passenger seats 14, and continuously along the entire aisle portion 24 in some examples.

Turning now to FIGS. 4-9, illustrative non-exclusive examples of systems 30 and lighting components 28 are illustrated. Where appropriate, the reference numerals from the schematic illustrations of FIGS. 1-3 are used to designate corresponding parts of the examples of FIGS. 4-9; however, the examples of FIGS. 4-9 are non-exclusive and do not limit systems 30 and lighting components 28 to the illustrated embodiments of FIGS. 4-9. That is, systems 30 and lighting components 28 are not limited to the specific embodiments of FIGS. 4-9, and may incorporate any number of the various aspects, configurations, characteristics, properties, etc. that are illustrated in and discussed with reference to the schematic representations of FIGS. 1-3 and/or any of the embodiments of FIGS. 4-9, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the examples of FIGS. 4-9; however, it is within the scope of the present disclosure that the previously discussed features, variants, etc. may be utilized with the examples of FIGS. 4-9.

FIGS. 4-5 illustrate a lighting component 94, which is an example of lighting component 28, shown in a bottom perspective view (FIG. 4) and cross section (FIG. 5). Lighting component 94 includes housing 50, cavity 54, light source 52 within cavity 54, light channel 56, first end region 62, second end region 64, first side wall 78, second side wall 80, front wall 84, mounting wall 82, lower wall 88, and upper wall 86. As shown in FIGS. 4-5, upper wall 86 of lighting component 94 extends farther from mounting wall 82 than does lower wall 88 (e.g., upper wall 86 has a greater than width than does lower wall 88). Such a configuration may prevent reflector surface 58 from being visible above housing 50 (e.g., from the point of view of a passenger seated in a passenger seat to which lighting component 94 is mounted, or adjacent passenger seats). For example, front wall 84 is configured to obstruct reflector surface 58 from passengers' line of sight (e.g., front wall 84 may obstruct a line of sight that is at least 6 inches, at least 12 inches, at least 18 inches, at least 24 inches, and/or at least 36 inches above housing 50).

Light channel 56 is formed between mounting wall 82 and front wall 84 in this example, as well as between upper wall 86 and lower wall 88. Lighting component 94 also includes a middle wall 96 connecting first side wall 78, second side wall 80, and front wall 84, with middle wall 96 extending from front wall 84 towards mounting wall 82. In lighting component 94, at least a portion of light channel 56 is formed between middle wall 96 and lower wall 88.

Optical absorber surface 60 extends from middle wall 96 towards upper wall 86 of lighting component 94. As best seen in FIG. 5, upper wall 86 and lower wall 88 may be substantially parallel to one another, and/or front wall 84 and mounting wall 82 may be substantially parallel to one another. Additionally or alternatively, first side wall 78 and second side wall 80 are substantially parallel to one another in some examples.

FIG. 6 shows a plurality of passenger seats 14 arranged in rows on either side of aisle portion 24 of cabin floor 16 of passenger aircraft 12. A plurality of lighting components 28 is positioned and secured within main cabin 10 to illuminate aisle portion 24, such as one respective lighting component 28 per respective row 18 of passenger seats 14. FIG. 7 illustrates a close-up view of one orientation of lighting component 28 as it may be mounted to passenger seat 14 in FIG. 6, such as to side portion 32 of passenger seat 14, adjacent lower structure 36 of seat portion 48. In other examples, lighting component 28 may be mounted elsewhere within aircraft 12, such as to side shroud 44 of passenger seat 14, to leg support 26, to seat portion 48, to lower surface 34 of seat portion 48, or elsewhere on side portion 32 of passenger seat 14. As shown in FIG. 7, lighting component is mounted to passenger seat 14 via mounting wall 82 (e.g., with mounting wall 82 facing, adjacent, contacting, and/or secured to passenger seat 14) in some examples. In the orientation shown in FIG. 7, lower wall 88 is arranged facing cabin floor 16, while upper wall 86 is arranged facing away from cabin floor 16, with lower wall 88 being closer to cabin floor 16 than is upper wall 86. Also as shown in the orientation of FIG. 7, lighting component 28 may be recessed with respect to side portion 32, and/or positioned such that lighting component 28 does not protrude past side portion 32 of passenger seat 14, towards or into the aisle between respective passenger seats 14.

FIG. 8 illustrates an elevation view of passenger seat 14 with lighting component 28 coupled to lower surface 34 of seat portion 48. As shown in FIG. 8, light beam 68 exits lighting component 28 and is directed towards aisle portion 24 of cabin floor 16. Light pattern 70 is created on aisle portion 24 to illuminate said aisle portion and objects that may be protruding therein. Light beam 68 does not travel upwards, away from cabin floor 16 in this example, due to the configuration of the housing and optical absorber surface of lighting component 28. As opposed to prior art emergency floor lighting that may be secured directly to the cabin floor, lighting component 28 is configured to be mounted above cabin floor 16 in order to illuminate it by shining light towards it (as opposed to the aforementioned emergency lighting mounted on the cabin floor, which projects light upwards, away from the cabin floor, and is not configured to uniformly light the span of the aisle). For example, lighting component 28 is mounted at a mounting height 98 above cabin floor 16 of at least 3 inches, at least 6 inches, at least 9 inches, at least 12 inches, at least 15 inches, at least 18 inches, at least 24 inches, and/or at least 36 inches off the cabin floor of the aircraft.

FIG. 11 illustrates another example of possible positioning for lighting component 28, which is shown recessed in side portion 44 of passenger seat 14. The orientation of the housing of lighting component 28 may be the same or similar orientation as that shown in FIG. 7, with this positioning having the potential to be even less detectable by passengers. As shown in FIG. 11, lighting component 28 may be recessed with respect to passenger seat 14 such that structures of passenger seat 14 do not interfere with light beams 68 being directed towards the cabin floor. In other examples, lighting component 28 may be positioned further away from the cabin floor, closer to the arm rest portion of passenger seat 14, and/or elsewhere within or on side portion 44 of passenger seat 14. In some examples, lighting component 28 may be angled with respect to passenger seat 14 and/or oriented differently than illustrated, FIG. 9 graphically represents a plurality of variables that may be changed, altered, adjusted, and/or optimized in order to, in turn, affect parameters of the resulting light pattern 70 in aisle portion 24 produced by lighting component 28. For example, adjusting one or more parameters of the housing 50 or reflector surface 58 may shorten or lengthen width cone 74 and/or a length 75 (FIG. 3) of light pattern 70 on aisle portion 24, with several possibilities for resulting light beams 68 (and corresponding light patterns 70) being shown in dashed line in FIG. 9. Additionally or alternatively, adjusting one or more parameters of housing 50 or reflector surface 58 may increase or decrease the horizontal distance between light source 52 and light pattern 70 (e.g., may increase or decrease the amount of floor space in aisle portion 24 that is not illuminated by lighting component 28), indicated in FIG. 9 by $I_{offset}$. Variables, or parameters, that may be adjusted may include a radius of reflector surface 58 ($r_{refl}$), a conic constant of reflector surface 58 ($K_{refl}$), a horizontal displacement of light source 52 relative to reflector surface 58 ($z_{refl}$), a width of reflector surface 58 ($w_{refl}$), length 67 of reflector surface 58 (FIG. 2), and/or a vertical displacement of light source 52 relative to reflector surface 58 ($y_{refl}$).

In some specific examples, increasing the conic constant of reflector surface 58 increases length 75 of light pattern 70 and decreases width cone 74 of light pattern 70. Similarly, decreasing the conic constant of reflector surface 58 in these examples decreases length 75 of light pattern 70 and increases width cone 74 of light pattern 70. In some examples, increasing the radius of reflector surface 58 reduces width cone 74 of light pattern 70. Similarly, in these examples, decreasing the radius of reflector surface 58 increases width cone 74 of light pattern 70. In some examples, increasing the horizontal displacement of light source 52 relative to reflector surface 58 (e.g., by extending upper wall 86 and/or lower wall 88 such that one or both protrudes father from mounting wall 82 of housing 50 shown in FIG. 4 may cause light channel 56 and reflector surface 58 to be further horizontally displaced from light source 52 within housing 50) increases length 75 of light pattern 70, increases width cone 74 of light pattern 70, and/or decreases the horizontal distance between light source 52 and light pattern 70 ($I_{offset}$). Similarly, in these examples, decreasing the horizontal displacement of light source 52 relative to reflector surface 58 decreases length 75 of light pattern 70, decreases width cone 74 of light pattern 70, and/or increases the horizontal distance between light source 52 and light pattern 70. In some examples, increasing the width ($w_{refl}$) of reflector surface 58 increases the horizontal distance between light source 52 and light pattern 70 ($I_{offset}$). Similarly, in these examples, decreasing the width of reflector surface 58 decreases the horizontal distance between light source 52 and light pattern 70 ($I_{offset}$). In some examples, increasing the vertical displacement of light source 52 relative to reflector surface 58 ($y_{refl}$) increases the horizontal distance between light source 52 and light pattern 70 ($I_{offset}$), and similarly, decreasing the vertical displacement of light source 52 relative to reflector surface 58 decreases the horizontal distance between light source 52 and light pattern 70. In some examples, increasing length 67 of reflector surface 58 increases length 75 of light pattern 70, and decreasing length 67 of reflector surface 58 decreases length 75 of light pattern 70.

FIG. 10 schematically provides a flowchart that represents illustrative, non-exclusive examples of methods according to the present disclosure. In FIG. 10, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 10 are not limiting and other methods and steps are within the scope of the present disclosure, including methods having greater than or fewer than the number of steps illustrated, as understood from the discussions herein.

Methods 100 include lighting (e.g., illuminating) at least a portion of an aisle portion (e.g., aisle portion 24) of a cabin floor (e.g., cabin floor 16) of an aircraft (e.g., aircraft 12) using one or more lighting components (e.g., lighting components 28) at 102, in accordance with the present disclosure. While the present disclosure discloses the use of lighting components for lighting the cabin floor of an aircraft, said lighting components may be used in other lighting situations as well (e.g., within other types of vehicles, in enclosed spaces, in areas having trip hazards, in areas where people frequently travel between two areas of contrasting light levels, and etc.).

For example, one or more lighting components and/or systems including a light component (e.g., system 30) may be provided at 104. A respective lighting component may be integrated into (e.g., incorporated into) a respective passenger seat or other structure within an aircraft at 106 and/or installed (e.g., mounted on, coupled to, secured to, etc.) on a passenger seat or other structure within an aircraft at 108. In some methods 100, a lighting component may be formed integrally with or secured to or integrated with a passenger seat at the time of manufacture, such that a passenger seat may be delivered with a light component according to the present disclosure, at 110. Advantageously, such integrating or installing at 106, 108 may be performed such that the lighting component housing does not protrude into the aisle or past the arm rest portion of the passenger seat. In some cases, the lighting components may be mounted on, secured to, recessed into, or otherwise positioned on the side of the passenger seat and/or on a lower surface/structure or leg support structure of the passenger seat, so as to be unobtrusive and in some cases, invisible to passengers from the perspective of being seated in the passenger seat.

Methods 100 may include installing, integrating, and/or delivering a plurality of respective lighting components. In some examples, each respective passenger seat may include a single respective lighting component, while in other examples, each respective passenger seat may include a plurality of respective lighting components coupled thereto, integrated therein, or delivered therewith. In some methods, integrating and/or installing the lighting component(s) at 106 and/or 108 include(s) strategically locating one or more lighting components within the passenger aircraft to minimize light emission into a cabin of the passenger aircraft, minimize the number of lighting components needed to illuminate the aisle portion, and/or ensure that the entire aisle portion is illuminated between adjacent passenger seats. Additionally or alternatively, integrating and/or installing the lighting component(s) at 106 and/or 108 may include configuring the lighting component and installing the lighting component relative to a passenger seat such that passengers on board the passenger aircraft do not have a direct line of sight to the light source of the lighting component, while seated in the passenger seat.

Lighting components arranged with respect to passenger seats and aisle portions of an aircraft may be powered at 112, such as by providing power to the lighting component, wiring the lighting component to the aircraft's electrical system, and/or providing a battery, capacitor, and/or other energy source to light a light source (e.g., light source 52) of the lighting component. In some methods, powering the lighting component at 112 includes powering the lighting component using solar energy and/or energy harvesting.

Some methods 100 include optimizing the shape and size of the reflector surface of the lighting component (and/or the shape and size of the housing of the lighting component) at 114 such that the lighting component is configured to illuminate substantially an entire width of the aisle portion of the cabin floor. For example, optimizing at 114 may include selecting, changing, altering, increasing, and/or decreasing a reflector radius of the reflector surface, reflector conic constant of the reflector surface, a horizontal displacement of the reflector surface relative to the light source, a reflector length of the reflector surface, a reflector width of the reflector surface, and/or a vertical displacement of the reflector surface relative to the light source to create a desired width, length, offset from the lighting component, and/or shape of a light pattern reflected onto the cabin floor of the passenger aircraft. In some examples, optimizing the size and shape of the housing at 114 includes minimizing the physical footprint of the lighting component.

Lighting the aisle portion at 102 may include illuminating objects in or protruding into the aisle portion of the cabin floor, thereby reducing trip hazards and/or injuries to passengers and/or crew members at 116. Additionally or alternatively, lighting the aisle portion at 102 may include configuring the lighting component to minimize light pollution within the passenger aircraft. In some examples, lighting the aisle portion at 102 includes illuminating the aisle portion in the zone of mesopic vision (between scotopic and photopic vision). In this manner, the aisle of the cabin floor may be illuminated in a dim, uniform fashion, to increase safety for those walking through the aisle, while minimizing light pollution or disturbances for passengers.

Illustrative, non-exclusive examples of inventive subject matter according to the present disclosure are described in the following enumerated paragraphs:

A1. A lighting component for illuminating a cabin floor of a passenger aircraft, the lighting component comprising:

a housing, wherein the housing defines a cavity and includes a light channel configured to allow light to exit the housing;

a light source contained within the cavity of the housing; and a reflector surface configured to reflect light emanating from the light source through the light channel and towards the cabin floor of the passenger aircraft, wherein the reflector surface is curved and at least partially defines the light channel.

A1.1. The lighting component of paragraph A1, wherein the housing is configured to be mounted and/or positioned within the passenger aircraft.

A1.2. The lighting component of any of paragraphs A1-A1.1, wherein the housing is mounted within the passenger aircraft.

A1.3. The lighting component of any of paragraphs A1-A1.2, wherein the housing is configured to be coupled to a passenger seat of the passenger aircraft.

A1.4. The lighting component of any of paragraphs A1-A1.3, wherein the housing is configured to be mounted to an inboard side of a/the passenger seat of the passenger aircraft.

A1.5. The lighting component of any of paragraphs A1-A1.4, wherein the housing is configured to be coupled to a side shroud of a/the passenger seat of the passenger aircraft.

A1.6. The lighting component of any of paragraphs A1-A1.5, wherein the housing is configured to be coupled to an underside of a cushion rail of a/the passenger seat of the passenger aircraft.

A1.7. The lighting component of any of paragraphs A1-A1.6, wherein the housing is configured to be integrated into a/the passenger seat of the passenger aircraft.

A1.8. The lighting component of any of paragraphs A1-A1.7, wherein the housing is configured to be recessed into a side panel of a/the passenger seat of the passenger aircraft.

A1.9. The lighting component of any of paragraphs A1-A1.8, wherein the housing is configured to be coupled to a/the passenger seat of the passenger aircraft such that the housing does not protrude past an arm rest of the passenger seat.

A1.10. The lighting component of any of paragraphs A1-A1.9, wherein the housing is configured to be coupled to a/the passenger seat of the passenger aircraft such that the housing does not protrude into an/the aisle portion of the cabin floor of the passenger aircraft.

A2. The lighting component of any of paragraphs A1-A1.10, further comprising an optical absorber surface arranged with respect to the reflector surface such that the optical absorber surface is configured to absorb light emanating from the light source.

A2.1. The lighting component of paragraph A2, wherein the optical absorber surface is configured to absorb light emanating from the light source in a direction towards the optical absorber surface.

A2.2. The lighting component of paragraph A2 or A2.1, wherein the optical absorber surface is configured to absorb light emanating from the light source in any undesired direction.

A3. The lighting component of any of paragraphs A1-A2.2, wherein a/the optical absorber surface is arranged opposite the reflector surface, and wherein the light channel is defined between the optical absorber surface and the reflector surface.

A4. The lighting component of any of paragraphs A1-A3, wherein a/the optical absorber surface, in combination with the housing, is configured to restrict, and optionally prevent, light emanating from the light source from exiting the light channel towards a/the cabin ceiling opposite the cabin floor of the passenger aircraft.

A5. The lighting component of any of paragraphs A1-A4, wherein the reflector surface is substantially concave facing the light channel.

A6. The lighting component of any of paragraphs A1-A5, wherein a/the optical absorber surface is substantially convex facing the light channel.

A7. The lighting component of any of paragraphs A1-A6, wherein the light channel extends longitudinally from a first end region of the housing to a second end region of the housing.

A8. The lighting component of any of paragraphs A1-A7, wherein the reflector surface extends longitudinally from a/the first end region of the housing to a/the second end region of the housing.

A9. The lighting component of any of paragraphs A1-A8, wherein a/the optical absorber surface extends longitudinally from a/the first end region of the housing to a/the second end region of the housing.

A10. The lighting component of any of paragraphs A1-A9, wherein the lighting component is configured to emit a substantially rectangular light pattern onto the cabin floor.

A11. The lighting component of any of paragraphs A1-A10, wherein the lighting component is configured to minimize light pollution within the passenger aircraft while being configured to illuminate the cabin floor.

A12. The lighting component of any of paragraphs A1-A11, wherein the lighting component is configured to illuminate an aisle portion of the cabin floor, extending between respective passenger seats positioned on either side of the aisle portion or adjacent rows of passenger seats positioned on either side of the aisle portion.

A13. The lighting component of any of paragraphs A1-A12, wherein the light source comprises a plurality of light sources contained within the housing.

A14. The lighting component of any of paragraphs A1-A13, wherein the light source comprises an LED.

A15. The lighting component of any of paragraphs A1-A14, wherein the light source is positioned opposite the light channel.

A16. The lighting component of any of paragraphs A1-A15, wherein the housing is configured to prevent the reflector surface from being visible from above the housing.

A17. The lighting component of any of paragraphs A1-A16, wherein the light source is configured to direct light towards the light channel.

A18. The lighting component of any of paragraphs A1-A17, wherein the lighting component is configured to illuminate one or more exterior surfaces located outside of the housing.

A19. The lighting component of any of paragraphs A1-A18, wherein the lighting component is configured to be mounted on a passenger seat of the passenger aircraft.

A20. The lighting component of any of paragraphs A1-A19, wherein the lighting component is configured to be mounted on a side of a/the passenger seat of the passenger aircraft, the side being adjacent an/the aisle portion of the cabin floor.

A21. The lighting component of any of paragraphs A1-A20, wherein the lighting component is configured to provide substantially uniform illumination of an/the aisle portion of the cabin floor between a first passenger seat to which the lighting component is coupled and a second passenger seat, wherein the first passenger seat and the second passenger seat are separated by the aisle portion.

A22. The lighting component of any of paragraphs A1-A21, wherein the lighting component is configured to dimly light a portion of the cabin floor of the passenger aircraft.

A23. The lighting component of any of paragraphs A1-A22, wherein the lighting component is configured to illuminate a portion of the cabin floor of the passenger aircraft with a luminance between 0.001 and 3 $cd/m^2$ (candela per square meter).

A24. The lighting component of any of paragraphs A1-A23, wherein the lighting component is configured to illuminate objects on or protruding into the cabin floor of the passenger aircraft within the zone of mesopic vision.

A25. The lighting component of any of paragraphs A1-A24, wherein the lighting component is configured to be hidden from passenger view.

A26. The lighting component of any of paragraphs A1-A25, wherein the lighting component is configured to reflect light onto an/the exterior surface outside the housing into a light pattern having a width cone sufficient to span an/the aisle of the cabin floor of the passenger aircraft.

A27. The lighting component of any of paragraphs A1-A26, wherein the lighting component is configured to illuminate objects on or protruding into an/the aisle portion of the cabin floor of the passenger aircraft.

A28. The lighting component of any of paragraphs A1-A27, wherein the housing has a length of less than about 5 inches, less than about 2 inches, less than about 1.5 inches, less than about 1 inch, and/or less than about 0.5 inches.

A29. The lighting component of any of paragraphs A1-A28, wherein the housing has a width of less than about 1.5 inches, less than about 1 inch, less than about 0.5 inches, and/or less than about 0.25 inches.

A30. The lighting component of any of paragraphs A1-A29, wherein the housing has a depth of less than about 1.5 inches, less than about 1 inch, less than about 0.5 inches, and/or less than about 0.25 inches.

A31. The lighting component of any of paragraphs A1-A30, wherein the housing includes one or more ports for powering the lighting component.

A32. The lighting component of any of paragraphs A1-A31, wherein the lighting component has a power consumption of less than about 2 watts, less than about 1.5 watts, less than about 1 watt, less than about 0.5 watts, and/or less than about 0.25 watts.

A33. The lighting component of any of paragraphs A1-A32, wherein the reflector surface is configured such that design parameters of the shape and size of the reflector surface can be altered to result in a desired light pattern on the cabin floor of the passenger aircraft.

A34. The lighting component of any of paragraphs A1-A33, wherein the reflector surface is configured such that a reflector radius, a reflector conic constant, a horizontal displacement of the reflector surface relative to the light source, a reflector length, a reflector width, and/or a vertical displacement of the reflector surface relative to the light source are configured to be optimized to create a desired width, length, offset from the lighting component, and/or shape of the light pattern reflected onto the cabin floor of the passenger aircraft.

A34.1. The lighting component of any of paragraphs A1-A34, wherein the reflector surface is configured such that selection of one or more reflector variables' values relative to one another creates a desired light pattern reflected onto the cabin floor of the passenger aircraft, wherein the reflector variables comprise a reflector radius, a reflector conic constant, a horizontal displacement of the reflector surface relative to the light source, a reflector length, a reflector width, and a vertical displacement of the reflector surface relative to the light source.

A35. The lighting component of any of paragraphs A1-A34.1, wherein the lighting component is powered by one or more of a battery, a capacitor, solar energy, hard-wiring to the aircraft's electrical system, and energy harvesting.

A36. The lighting component of any of paragraphs A1-A35, wherein the reflector surface comprises a specular reflective material.

A37. The lighting component of any of paragraphs A1-A36, wherein the reflector surface comprises aluminum adhesive tape.

A38. The lighting component of any of paragraphs A1-A37, wherein the reflector surface comprises specular reflective paint.

A39. The lighting component of any of paragraphs A1-A38, wherein the reflector surface comprises a metal material deposition layer.

A40. The lighting component of any of paragraphs A1-A39, wherein the reflector surface comprises a polymeric specular film.

A41. The lighting component of any of paragraphs A1-A40, wherein the reflector surface comprises an adhesive film.

A42. The lighting component of any of paragraphs A1-A41, wherein the housing comprises a 3D printing resin.

A43. The lighting component of any of paragraphs A1-A42, wherein the housing comprises Kydex.

A44. The lighting component of any of paragraphs A1-A43, wherein a/the optical absorber surface comprises the same material as the housing.

A45. The lighting component of any of paragraphs A1-A44, wherein the housing comprises a first side wall in a/the first end region of the housing, a second side wall in a/the second end region of the housing, a mounting wall extending between the first side wall and the second side wall, and a front wall opposite the mounting wall.

A46. The lighting component of paragraph A45, wherein the housing comprises an upper wall connecting the first side wall, the second side wall, the mounting wall, and the front wall.

A47. The lighting component of paragraph A45 or A46, wherein the housing comprises a lower wall connecting the first side wall, the second side wall, and the mounting wall.

A48. The lighting component of A47, wherein the lower wall is opposite a/the upper wall.

A49. The lighting component of any of paragraphs A45-A48, wherein the housing is configured to be coupled to a/the passenger seat of the passenger aircraft via the mounting wall.

A50. The lighting component of any of paragraphs A45-A49, wherein the light source is coupled to the mounting wall.

A51. The lighting component of any of paragraphs A45-A50, wherein a/the upper wall extends farther from the mounting wall than does a/the lower wall.

A52. The lighting component of any of paragraphs A45-A51, wherein the light channel is formed between the mounting wall and the front wall.

A53. The lighting component of any of paragraphs A45-A52, wherein the light channel is formed between a/the upper wall and a/the lower wall.

A54. The lighting component of any of paragraphs A45-A53, wherein the housing further comprises a middle wall connecting the first side wall, the second side wall, and the front wall.

A55. The lighting component of paragraph A54, wherein the middle wall extends from the front wall towards the mounting wall.

A56. The lighting component of paragraph A54 or A55, wherein the light channel is formed between the middle wall and a/the lower wall.

A57. The lighting component of any of paragraphs A45-A56, wherein the reflector surface is adjacent a/the lower wall.

A58. The lighting component of any of paragraphs A45-A57, wherein the reflector surface extends from a/the lower wall towards a/the upper wall.

A59. The lighting component of any of paragraphs A45-A58, wherein a/the optical absorber surface extends from a/the middle wall towards a/the upper wall.

A60. The lighting component of any of paragraphs A45-A59, wherein a/the upper wall and a/the lower wall are substantially parallel to one another.

A61. The lighting component of any of paragraphs A45-A60, wherein the front wall and the mounting wall are substantially parallel to one another.

A62. The lighting component of any of paragraphs A45-A61, wherein the first side wall and the second side wall are substantially parallel to one another.

A63. The lighting component of any of paragraphs A45-A62, wherein the front wall is configured to obstruct the reflector surface such that it is not visible to a passenger seated in a/the passenger seat of the aircraft.

A64. The lighting component of any of paragraphs A45-A63, wherein the front wall is positioned with respect to the reflector surface such that the front wall obstructs a line of sight that is at least 6 inches, at least 12 inches, at least 18 inches, at least 24 inches, and/or at least 36 inches above the housing.

A65. The lighting component of any of paragraphs A1-A64, wherein the housing is configured to be mounted at least 3 inches, at least 6 inches, at least 9 inches, at least 12 inches, at least 15 inches, at least 18 inches, at least 24 inches, and/or at least 36 inches off the cabin floor of the aircraft.

B1. A system for illuminating a cabin floor of a passenger aircraft, the system comprising: a plurality of lighting components according to any of paragraphs A1-A65.

B2. The system of paragraph B1, further comprising a/the passenger seat of the passenger aircraft.

B2.1. The system of paragraph B1 or B2, wherein the system comprises a plurality of passenger seats within the passenger aircraft, wherein each respective passenger seat of the plurality of passenger seats includes a respective lighting component of the plurality of lighting components.

B2.2. The system of any of paragraphs B1-B2.1, wherein the system comprises a plurality of passenger seats within the passenger aircraft, wherein at least a portion of the plurality of passenger seats comprises lighted passenger seats, wherein each respective lighted passenger seat includes a respective lighting component of the plurality of lighting components.

B3. The system of any of paragraphs B2-B2.2, wherein each respective lighting component of the plurality of lighting components is coupled to a respective passenger seat.

B4. The system of any of paragraphs B2-B3, wherein each respective lighting component of the plurality of lighting components is mounted to an inboard side of a respective passenger seat.

B5. The system of any of paragraphs B2-B4, wherein each respective lighting component of the plurality of lighting components is coupled to a side shroud of a respective passenger seat.

B6. The system of any of paragraphs B2-B5, wherein each respective lighting component of the plurality of lighting components is coupled to an underside of a cushion rail of a respective passenger seat.

B7. The system of any of paragraphs B2-B6, wherein each respective lighting component of the plurality of lighting components is integrated into a respective passenger seat.

B7.1. The system of any of paragraphs B2-B7, wherein each respective lighting component of the plurality of lighting components is integrally formed with a respective passenger seat.

B8. The system of any of paragraphs B2-B7.1, wherein each respective lighting component of the plurality of lighting components is recessed into a side panel of a respective passenger seat.

B9. The system of any of paragraphs B2-B8, wherein each respective lighting component of the plurality of lighting components is coupled to a respective passenger seat such that the housing does not protrude past an arm rest of the respective passenger seat.

B10. The system of any of paragraphs B2-B9, wherein each respective lighting component of the plurality of lighting components is coupled to a respective passenger seat such that the housing does not protrude into an/the aisle portion of the cabin floor of the passenger aircraft.

B11. The system of any of paragraphs B2-B10, wherein the system comprises a plurality of passenger seats arranged on either side of an/the aisle portion of the cabin floor of the passenger aircraft, thereby forming one or more rows of passenger seats.

B11.1. The system of any of paragraphs B2-B11, wherein the system comprises a first plurality of passenger seats arranged on a first side of an/the aisle portion of the cabin floor of the passenger aircraft and a second plurality of passenger seats arranged on a second side of the aisle portion, the first side of the aisle portion being opposite the second side of the aisle portion, wherein the first plurality of passenger seats and the second plurality of passenger seats are positioned with respect to one another to form a plurality of rows of passenger seats with the aisle portion being positioned between the first plurality of passenger seats and the second plurality of passenger seats, and wherein the plurality of lighting components comprises one respective lighting component per row of passenger seats.

B12. The system of paragraph B11 or B11.1, wherein the plurality of lighting components comprises one respective lighting component per row of passenger seats.

B13. The system of any of paragraphs B11-B12, wherein the plurality of lighting components is distributed evenly amongst the passenger seats.

B14. The system of any of paragraphs B11-B13, wherein the plurality of lighting components is distributed evenly amongst the rows passenger seats.

B15. The system of any of paragraphs B1-B14, wherein each respective lighting component of the plurality of lighting components is mounted to a rubstrip of a monument or a/the passenger seat.

B16. The system of any of paragraphs B1-B15, wherein the plurality of lighting components comprises one lighting component per row per aisle portion of the passenger aircraft.

B17. The system of any of paragraphs B1-B16, wherein a/the passenger seat is cantilevered.

B18. The system of any of paragraphs B1-B17, wherein a/the passenger seat comprises a leg support that is spaced apart from an/the aisle portion of the cabin floor.

B19. The system of paragraph B18, wherein the leg support is positioned outboard relative to the aisle portion.

B20. The system of paragraph B18 or B19, wherein the leg support is positioned outboard relative to the lighting component.

B21. The system of any of paragraphs B1-B20, wherein a/the passenger seat comprises a storage cavity defined between a lower surface of a seat portion of the passenger seat, the cabin floor, and/or a/the leg support of the passenger seat.

B22. The system of paragraph B21, wherein the plurality of lighting components is configured to direct light towards the cabin floor without illuminating the storage cavity.

C1. An aircraft comprising the lighting component of any of paragraphs A1-A65.

C2. The aircraft of paragraph C1, further comprising the system of any of paragraphs B1-B22.

C3. The aircraft of paragraph C1 or C2, wherein the aircraft is a commercial passenger aircraft.

D1. A method, comprising:
illuminating an aisle portion of a cabin floor of a passenger aircraft using one or more lighting components of any of paragraphs A1-A65 and/or the system of any of paragraphs B1-B22.

D1.1. The method of paragraph D1, further comprising providing the one or more lighting components and/or the system.

D2. The method of paragraph D1 or D1.1, further comprising integrating a respective lighting component into one or more respective passenger seats.

D3. The method of paragraph D2 wherein the integrating the respective lighting component into the respective passenger seat comprises incorporating the lighting component into the passenger seat during manufacturing.

D4. The method of any of paragraphs D1-D3, further comprising delivering a passenger seat that includes the lighting component integrated therein and/or coupled thereto.

D5. The method of any of paragraphs D1-D4, further comprising powering the plurality of lighting components using one or more of a battery, a capacitor, solar energy, the aircraft's electrical system, and energy harvesting.

D6. The method of any of paragraphs D1-D5, further comprising installing one or more respective lighting components into one or more respective passenger seats of the passenger aircraft.

D7. The method of any of paragraphs D1-D6, further comprising optimizing the shape and size of the reflector surface of the lighting component such that the lighting component is configured to illuminate substantially an entire width of the aisle portion of the cabin floor.

D8. The method of any of paragraphs D1-D7, further comprising selecting, changing, altering, and/or optimizing a reflector radius of the reflector surface to create a desired width, length, offset from the lighting component, and/or shape of a light pattern reflected onto the cabin floor of the passenger aircraft.

D9. The method of any of paragraphs D1-D8, further comprising selecting, changing, altering, and/or optimizing a reflector conic constant of the reflector surface to create a desired width, length, offset from the lighting component, and/or shape of a light pattern reflected onto the cabin floor of the passenger aircraft.

D10. The method of any of paragraphs D1-D9, further comprising selecting, changing, altering, and/or optimizing a horizontal displacement of the reflector surface relative to the light source to create a desired width, length, offset from the lighting component, and/or shape of a light pattern reflected onto the cabin floor of the passenger aircraft.

D11. The method of any of paragraphs D1-D10, further comprising selecting, changing, altering, and/or optimizing a reflector length of the reflector surface to create a desired width, length, offset from the lighting component, and/or shape of a light pattern reflected onto the cabin floor of the passenger aircraft.

D12. The method of any of paragraphs D1-D11, further comprising selecting, changing, altering, and/or optimizing a reflector width of the reflector surface to create a desired width, length, offset from the lighting component, and/or shape of a light pattern reflected onto the cabin floor of the passenger aircraft.

D13. The method of any of paragraphs D1-D12, further comprising selecting, changing, altering, and/or optimizing a vertical displacement of the reflector surface relative to the light source to create a desired width, length, offset from the lighting component, and/or shape of a light pattern reflected onto the cabin floor of the passenger aircraft.

D14. The method of any of paragraphs D1-D13, wherein the illuminating the aisle portion of the cabin floor comprises illuminating objects in or protruding into the aisle portion of the cabin floor.

D15. The method of any of paragraphs D1-D14, further comprising configuring the lighting component to minimize light pollution within the passenger aircraft.

D16. The method of any of paragraphs D1-D15, further comprising configuring the lighting component and installing the lighting component relative to a passenger seat such that passengers on board the passenger aircraft do not have a direct line of sight to the light source of the lighting component, while seated in the passenger seat.

D17. The method of any of paragraphs D1-D16, further comprising reducing the risk of injuries from tripping on objects or items in or protruding into the aisle portion of the cabin floor.

D18. The method of any of paragraphs D1-D17, wherein the illuminating the aisle portion of the cabin floor comprises illuminating the aisle portion in the zone of mesopic vision.

D19. The method of any of paragraphs D1-D18, further comprising minimizing the physical footprint of the lighting component.

D20. The method of any of paragraphs D1-D19, further comprising strategically locating the one or more lighting components within the passenger aircraft to minimize light emission into a cabin of the passenger aircraft, minimize the number of lighting components needed to illuminate the aisle portion, and/or ensure that the entire aisle portion is illuminated between adjacent passenger seats.

E1. The use of the lighting component of any of paragraphs A1-A65 to illuminate a cabin floor of a passenger aircraft.

F1. The use of the system of any of paragraphs B1-B22 to illuminate a cabin floor of a passenger aircraft.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and systems and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein, and such inventive subject matter may find utility in apparatuses, systems, and/or methods that are not expressly disclosed herein.

The invention claimed is:

1. A passenger aircraft, comprising:
   a cabin floor within a passenger cabin of the passenger aircraft, wherein the cabin floor comprises an aisle having an aisle width;
   a plurality of passenger seats arranged on the cabin floor, forming one or more rows of adjacent passenger seats; and
   a plurality of lighting components for illuminating the cabin floor of the passenger aircraft, each respective lighting component of the plurality of lighting components comprising:
      a housing defining a cavity and including a light channel configured to allow light to exit the housing, wherein the housing restricts light from exiting the housing other than through the light channel;
      a light source contained within the cavity of the housing and configured to emit visible light towards the light channel, wherein the light source creates a light pattern on the aisle of the cabin floor, and wherein the light pattern has a width cone that is sufficient to span the aisle width;
      a reflector surface configured to reflect visible light emanating from the light source through the light channel and towards the cabin floor of the passenger aircraft, wherein the reflector surface is curved and at least partially defines the light channel, and wherein the reflector surface is substantially concave facing the light channel of the lighting component; and
      an optical absorber surface arranged with respect to the reflector surface such that the optical absorber surface is configured to restrict visible light emanating from the light source from exiting the light channel in a direction towards a cabin ceiling opposite the cabin floor of the passenger aircraft, wherein the optical absorber surface of each respective lighting component is substantially convex facing the light channel, and wherein each respective lighting component is coupled to a respective passenger seat of the plurality of passenger seats.

2. The passenger aircraft according to claim 1, wherein the optical absorber surface of each respective lighting component is arranged opposite the reflector surface of the respective lighting component, and wherein the light channel of each respective lighting component is defined between the optical absorber surface and the reflector surface of the respective lighting component.

3. The passenger aircraft according to claim 1, wherein each respective light channel extends longitudinally from a respective first end region of a respective housing to a respective second end region of the respective housing and wherein the respective reflector surface extends longitudinally from the respective first end region of the respective housing to the respective second end region of the respective housing.

4. The passenger aircraft according to claim 1, wherein a first portion of the plurality of passenger seats and a second portion of the plurality of passenger seats are arranged on either side of the aisle of the cabin floor with respect to each other, wherein each respective lighting component is configured to illuminate a respective portion of the aisle extending between respective passenger seats positioned on either side of the aisle.

5. The passenger aircraft according to claim 4, wherein each respective lighting component is configured to provide substantially uniform illumination of the respective portion of the aisle of the cabin floor between a first respective passenger seat of the plurality of passenger seats, to which the lighting component is coupled, and a second respective passenger seat of the plurality of passenger seats, wherein the first respective passenger seat and the second respective passenger seat are separated by the aisle.

6. The passenger aircraft according to claim 4, wherein each respective lighting component is configured to illuminate objects on or protruding into the respective portion of the aisle of the cabin floor, within a zone of mesopic vision.

7. The passenger aircraft according to claim 4, wherein each respective lighting component is mounted on a respective passenger seat of the passenger aircraft without protruding into the aisle.

8. The passenger aircraft according to claim 1, wherein each respective light source comprises an LED.

9. The passenger aircraft according to claim 1, wherein the reflector surface is configured such that selection of one or more reflector variable values relative to one another creates a predetermined light pattern reflected onto the cabin floor of the passenger aircraft, wherein the one or more reflector variables comprise a reflector radius, a reflector conic constant, a horizontal displacement of the reflector surface relative to the light source, a reflector length, a reflector width, and a vertical displacement of the reflector surface relative to the light source.

10. The passenger aircraft according to claim 1, wherein each respective reflector surface comprises a specular adhesive film.

11. A system for illuminating a cabin floor of a passenger aircraft, the system comprising:
    a plurality of lighting components, each lighting component comprising:
       a housing, wherein the housing defines a cavity and a light channel configured to allow light to exit the housing, wherein the housing restricts light from exiting the housing other than through the light channel;
       a light source contained within the cavity of the housing and configured to emit visible light towards the light channel, wherein the light source creates a light pattern on an aisle of the cabin floor, and wherein the light pattern has a width cone that is sufficient to span an aisle width of the aisle of the cabin floor;
       a reflector surface configured to reflect visible light emanating from the light source through the light channel and towards the cabin floor of the passenger aircraft, wherein the reflector surface is curved and forms a portion of the light channel, and wherein the reflector surface is substantially concave facing the light channel of the lighting component; and
       an optical absorber surface arranged with respect to the reflector surface such that the optical absorber surface is configured to restrict visible light emanating from the light source from exiting the light channel in a direction towards a cabin ceiling opposite the cabin floor of the passenger aircraft, wherein the optical absorber surface of each respective lighting component is substantially convex facing the light channel; and
    a plurality of passenger seats positioned within the passenger aircraft, wherein each passenger seat of the plurality of passenger seats includes a respective lighting component of the plurality of lighting components.

12. The system according to claim 11, further comprising:
a first plurality of passenger seats arranged on a first side of the aisle of the cabin floor of the passenger aircraft; and
a second plurality of passenger seats arranged on a second side of the aisle, wherein the first side of the aisle is opposite the second side of the aisle, wherein the first plurality of passenger seats and the second plurality of passenger seats are positioned with respect to one another to form a plurality of rows of passenger seats such that the aisle is positioned between the first plurality of passenger seats and the second plurality of passenger seats, and wherein the plurality of lighting components comprises one respective lighting component per row of passenger seats.

13. A method for illuminating a cabin floor of a passenger aircraft, the method comprising:
powering a plurality of lighting components using one or more selected from the group consisting of a battery, a capacitor, solar energy, an electrical system of the passenger aircraft, and energy harvesting, wherein each lighting component of the plurality of lighting components comprises:
a housing, wherein the housing defines a cavity and a light channel configured to allow light to exit the housing, wherein the housing restricts light from exiting the housing other than through the light channel;
a light source contained within the cavity of the housing and configured to emit visible light towards the light channel;
a reflector surface configured to reflect light emanating from the light source through the light channel and towards the cabin floor of the passenger aircraft, wherein the reflector surface is curved and forms a portion of the light channel, and wherein the reflector surface is substantially concave facing the light channel of the lighting component; and
an optical absorber surface arranged with respect to the reflector surface such that the optical absorber surface is configured to restrict visible light emanating from the light source from exiting the light channel in a direction towards a cabin ceiling opposite the cabin floor of the passenger aircraft, wherein the optical absorber surface of each respective lighting component is substantially convex facing the light channel; and
forming a light pattern on an aisle portion of the cabin floor using the plurality of lighting components, wherein the light pattern has a width cone that is sufficient to span an aisle width of the aisle portion of the cabin floor.

14. The method according to claim 13, further comprising integrating a respective lighting component of the plurality of lighting components into one or more respective passenger seats of the passenger aircraft.

15. The method according to claim 13, further comprising delivering a passenger seat that includes a respective lighting component of the plurality of lighting components integrated within the passenger seat.

16. The method according to claim 13, further comprising illuminating objects in or protruding into the aisle portion of the cabin floor of the passenger aircraft using the plurality of lighting components.

* * * * *